K. DEVICH.
ELECTRIC TRAP.
APPLICATION FILED APR. 14, 1911.
1,034,212.
Patented July 30, 1912.
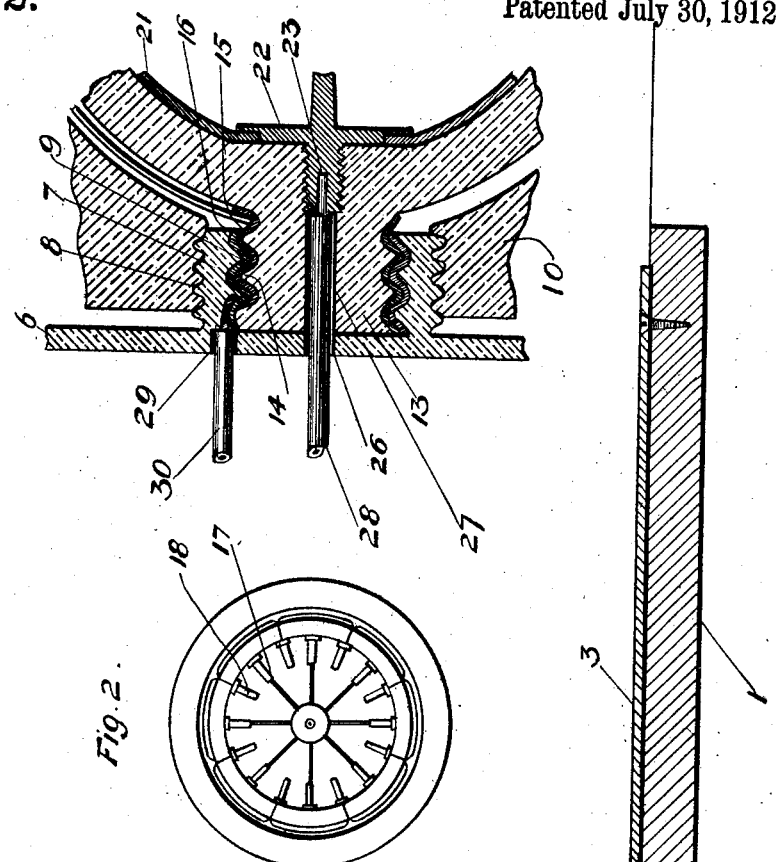
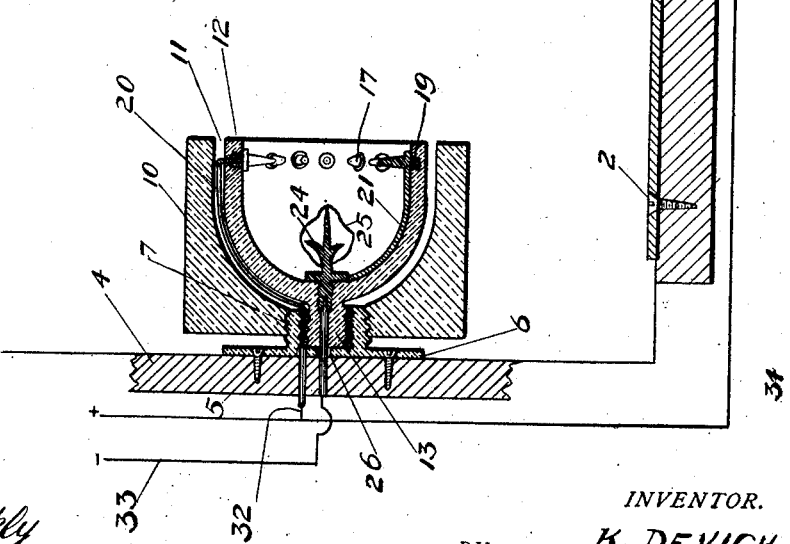
WITNESSES:
Erich Burkly
K. H. Butler
INVENTOR.
K. DEVICH.
BY
ATTORNEYS.

UNITED STATES PATENT OFFICE.

KÁROLY DEVICH, OF AKRON, OHIO.

ELECTRIC TRAP.

1,034,212.   Specification of Letters Patent.   Patented July 30, 1912.

Application filed April 14, 1911. Serial No. 621,126.

*To all whom it may concern:*

Be it known that I, KÁROLY DEVICH, a subject of the King of Hungary, residing at Akron, in the county of Summit and State of Ohio, have invented certain new and useful Improvements in Electric Traps, of which the following is a specification, reference being had therein to the accompanying drawing.

This invention relates to electric traps, and the objects of my invention are to provide a trap that can be advantageously used for exterminating rats and other rodents, and to provide a trap wherein electricity is utilized for electrocuting the rodents.

I attain the above objects by a mechanical construction that is simple, durable, safe to use, and inexpensive to manufacture.

The invention will be hereinafter specifically described and then claimed, and reference will now be had to the drawing, wherein:—

Figure 1 is a longitudinal sectional view of the trap. Fig. 2 is a front elevation of a portion of the same, and Fig. 3 is an enlarged longitudinal sectional view of a portion of the trap.

A trap in accordance with this invention comprises a wooden block or floor 1 to which is secured, by screws 2 or other fastening means a metallic plate 3. The metallic plate 3 is located adjacent to the wall or other support 4 and secured to said wall by screws or other fastening means 5 is the annular flange 6 of a socket 7. The socket 7 is exteriorly screw threaded, as at 8 and interiorly screw threaded, as at 9.

Screwed upon the socket 7 is a housing 10 having a cup-shaped recess 11. Located in the recess 11 is a cup-shaped member 12 of less diameter than the recess 11, thereby providing a space between the outer wall of the member 12 and the inner wall of the housing 10. The member 12 has a rearwardly extending stem 13 that is exteriorly screw-threaded, as at 14 to receive a metallic threaded sleeve 15 and this sleeve is adapted to screw into a metallic threaded sleeve 16 held by the threads 9 of the socket 7. The sleeves 15 and 16 are made of metal and the socket 7, the member 12 and the housing 10 are preferably made of an insulating material, as porcelain.

The inner wall of the member 12, adjacent to the outer edge of said member is provided with a plurality of circumferentially arranged metallic contacts 17 and 18, said contacts having threaded shanks 19 screwed into the member 12. The shanks 19 of the contacts 18 are connected to the metallic sleeve 15 by wires 20 located in the recess 11. The contacts 17 are connected to a bait-holder 22 by wires 21 arranged against the inner wall of the member 12, said bait holder having a threaded shank 23 screwed into the stem 13. The bait holder 22 has prongs 24 upon which a bait 25 can be placed.

Extending through the wall 4, into an opening 26 provided therefor in the socket 7 and an opening 27 provided therefor in the stem 13, is a conduit 28. Extending through the wall 4 into an opening 29 provided therefor in the socket 7, is a conduit 30. Connected to the metallic plate 3 is a positive wire 31 having a branch 32 extending through the conduit 30 and connected to the metallic sleeve 16. A negative wire 33 extends through the conduit 28 to the bait holder 22, and batteries or any suitable source of power can be used for supplying a current to the wires 31 and 33.

By this construction it will be seen that one of the circuit terminals is fixedly secured to the sleeve 16, while the other terminal extends into the rear of the bait-holder, the remaining parts of the circuit connections which provide for an electrocuting circuit between the projections or between some of the projections of the bait-holder are carried by the cup-shaped member 12. As the latter is threaded to the socket, it will be readily understood that this member may be removed for the purpose of cleaning or repairs without affecting the permanent circuit terminals carried by the socket and provided through the leading-in wire 33.

A rat standing on hind legs upon the plate 3 and attempting to reach the bait 25 will be immediately electrocuted upon the head of the rat contacting with the prongs 24 of the bait holder and should the rat fail to reach the bait and its body engage some of the contacts 17, a circuit will be completed that will also electrocute the rat.

Suitable insulation is used wherever necessary, and it is thought that the operation of the trap will be fully understood without further description.

What I claim is:—

1. In an electric trap a metallic plate, a socket adjacent said plate, a cup-shaped member threaded to and supported by said socket, a bait-holder threaded to said socket and housed within said member, and connections between said holder and plate to provide an electrocuting circuit.

2. In an electric trap, a socket, a bait-holder carrier threaded to and carried by said socket, a bait-holder within said carrier and forming one terminal of an electrocuting circuit, and a plate adjacent to said carrier and providing another terminal of said circuit.

3. In an electric trap, a socket having a circuit terminal, a bait-holder carrier threaded to said socket and having an inwardly extending terminal projection in circuit with said socket terminal when the carrier is threaded thereto, said projection forming a terminal of an electrocuting circuit, and a bait-holder housed by said carrier and forming another terminal of the electrocuting circuit.

4. In an electric trap, a socket having a circuit terminal, a bait-holder carrier threaded to said socket and having an inwardly extending terminal projection in circuit with said socket terminal when the carrier is threaded thereto, said projection forming a terminal of an electrocuting circuit, and a bait-holder housed by said carrier and positioned in the rear of said projection and forming another terminal of the electrocuting circuit.

5. In an electric trap a socket having a circuit terminal, a bait-holder carrier threaded to said socket and having spaced-apart inwardly extending terminal projections, and a bait-holder housed within said carrier in the rear of said projections and connected in circuit with another circuit terminal, said socket terminal and said bait-holder having circuit connections with said projections, said projections providing terminals of an electrocuting circuit.

6. In an electric trap, a socket, a bait-holder carrier threaded to said socket and having an inwardly extending terminal projection, a bait-holder carried by said carrier in rear of said projection and in circuit with said projection and with a suitable source of electrical energy, and a plate also in circuit with said source of energy, said plate and said projection forming the terminals of an electrocuting circuit.

In testimony whereof I affix my signature in the presence of two witnesses.

KÁROLY DEVICH.

Witnesses:
 LOUIS HERSHEY,
 JOSEPH HERSHEY.

---

Copies of this patent may be obtained for five cents each, by addressing the "Commissioner of Patents, Washington, D. C."